United States Patent [19]

Behr et al.

[11] Patent Number: 4,496,373
[45] Date of Patent: Jan. 29, 1985

[54] DIFFUSION MEMBRANE AND PROCESS FOR SEPARATING HYDROGEN FROM GAS MIXTURE

[75] Inventors: Friedrich Behr, Essen; Rudolf Schulten, Aachen Richterich; Walter Weirich, Aachen, all of Fed. Rep. of Germany

[73] Assignee: Kernforschungsanlage Jülich Gesellschaft mit beschränkter Haftung, Jülich, Fed. Rep. of Germany

[21] Appl. No.: 617,831

[22] Filed: Jun. 6, 1984

Related U.S. Application Data

[63] Continuation of Ser. No. 446,068, Dec. 2, 1982, abandoned.

[30] Foreign Application Priority Data

Dec. 11, 1981 [DE] Fed. Rep. of Germany ....... 3149084
Dec. 11, 1981 [DE] Fed. Rep. of Germany ....... 3149155

[51] Int. Cl.³ ............................................. B01D 53/22
[52] U.S. Cl. ........................................... 55/16; 55/158
[58] Field of Search .................... 55/16, 158; 420/427, 420/580; 427/405, 436; 428/670

[56] References Cited

U.S. PATENT DOCUMENTS

| | | | |
|---|---|---|---|
| 2,958,391 | 11/1960 | DeRosset | 55/16 |
| 3,128,178 | 4/1964 | Duffek, Jr. | 420/580 |
| 3,148,031 | 9/1964 | Vahldieck et al. | 55/16 |
| 3,350,846 | 11/1967 | Makrides et al. | 55/16 |
| 3,371,468 | 3/1968 | Shropshire | 55/158 |
| 3,407,571 | 10/1968 | Sherwood | 55/158 |
| 3,413,777 | 12/1968 | Langley, et al. | 55/158 |
| 3,439,474 | 4/1969 | McKinley | 55/16 |
| 3,447,286 | 6/1969 | Dounoucos | 55/16 |
| 3,497,390 | 2/1970 | Greene et al. | 55/158 X |
| 4,235,863 | 11/1980 | Schulten et al. | 423/648 R |

FOREIGN PATENT DOCUMENTS

| | | | |
|---|---|---|---|
| 1558409 | 3/1970 | Fed. Rep. of Germany . | |
| 1292025 | 10/1972 | United Kingdom | 55/16 |
| 1346422 | 2/1974 | United Kingdom . | |

*Primary Examiner*—Robert Spitzer
*Attorney, Agent, or Firm*—Frishauf, Holtz, Goodman & Woodward

[57] ABSTRACT

For separation of hydrogen and its isotopes by diffusion through a membrane virtually impermeable to other gases, a non-porous hydrogen-permeable metallic membrane is provided on the gas access side with a coating of an alloy of palladium with at least 45 atomic % Cu or at least 50 atomic percent Ag or at least 7 atomic % Y, the membrane itself containing Cu, Ag or Y respectively in a concentration at least equilibrated with the coating at operation temperature. Preferably the membrane consists of a metal of niobium and/or tantalum bases especially of an alloy containing from 10 to 30 % Ti, 3 to 10 % V, 0 to 25 % Nb and at least 30 % Ta, all by weight, and preferably it is of a composition of 20 to 25 % Ti, 5 to 7,5 % V, 0 to 25 Nb, and at least 50 % Ta, being saturated with copper and or silver, while a copper and/or silver palladium alloy coating is used. Such inherently oxidation sensitive membranes can be stabilized by provision of an internal intermediate layer in the form of a melt forming or containing an alkaline metal hydride and/or an alkaline earth metal hydride. A melt containing alkaline metal and/or alkaline earth metal which forms a hydride, brought into contact on the secondary side of a membrane in accordance with the invention, provides a hydrogen sink on the secondary side and inhibits internal hydride formation and secondary side oxidation of the membrane.

20 Claims, 2 Drawing Figures

DIFFUSION MEMBRANE AND PROCESS FOR SEPARATING HYDROGEN FROM GAS MIXTURE

This is a continuation of application Ser. No. 446,068, filed Dec. 2, 1982, now abandoned.

This invention concerns non-porous hydrogen-permeable diffusion membranes as well as the separation of hydrogen from gas mixtures by a non-porous metallic material in the form of a membrane that is selectively permeable for hydrogen, the membrane being coated with a palladium alloy on the hydrogen entry side. The diffusion through the membrane takes place at elevated temperature.

The separation of hydrogen from gas mixtures or out of an electrolyte in connection with its cathodic evolution by diffusion through a palladium partition wall is known. Diffusion walls of other hydrogen-permeable materials are also known which are coated with palladium or a palladium alloy on the side to which gas or a gas mixture is supplied (see U.S. Pat. No. 3,407,571). As an example for a thin palladium alloy layer of this sort on the primary side (on steel) a layer of palladium-silver has been mentioned that is to contain up to 60% silver, especially, however, from 10 to 50% of silver. For acceleration of the diffusion such partitions are intended particularly for use at raised temperatures that can reach up to about 820° C., with temperatures from about 150° to 260° C. being preferred. Furthermore, a pressure difference between primary and secondary sides is to be maintained, which should be at least about 1 bar and preferably can go up to about 100 bars.

Such membranes coated with palladium or palladium alloy have the disadvantage that in operation at raised temperatures over longer periods there occurs a diffusion of the palladium or palladium alloy layer on the gas entry side into the main membrane material, so that the protection and dissociation effect of the palladium coating diminishes or fails.

SUMMARY OF THE INVENTION

It is an object of the invention to provide a hydrogen diffusion membrane that remains usable, even at raised temperatures and over long periods.

Briefly, copper, silver or yttrium is chosen as the alloy metal partner in the palladium alloy coating, in quantities of at least 45 atomic percent in the case of copper, at least 50 atomic percent in the case of silver and at least 7 atomic percent in the case of yttrium, and the membrane itself is provided with a content of the alloy partner, namely copper, silver or yttrium, at least sufficient to provide an equilibrium with the palladium alloy. Preferably the membrane material itself, which is preferably of a base of tantalum, niobium, or both, is saturated with the copper, silver or yttrium.

The provision of the equilibrium concentration or saturation has the effect that the composition of the palladium-containing layer does not change in the course of time, so that the minimum concentrations of the alloy partner above set forth are accordingly not understepped. Palladium that is alloyed in the named quantities with copper, silver or yttrium, is thus practically "blocked" on the surface: an impoverishment of the layer in copper, silver or yttrium would, on the contrary, lead to an increased mobility of the palladium which would then also diffuse into the partition. The Pd/Cu coating of the diffusion partition should contain at least 45 atomic percent copper, while alloys having from 45 to 72 atomic percent of copper and the remainder palladium are particularly useful. Silver-containing coatings contain between 50 and 75 atomic percent of silver. In the case of yttrium-containing layers, the yttrium proportion lies between 7.1 and 16.4 atomic percent of the palladium-yttrium alloy. Such palladium-yttrium coatings are distinguished by a particularly favorable permeability for hydrogen.

Because of the high theoretical diffusion rates of hydrogen and its isotopes in tantalum and/or niobium, these last-mentioned materials appear to be the most suitable main membrane materials. Copper and also silver are barely soluble in them and form no mixed crystals with them. Palladium itself is, however, soluble in them, but palladium alloys with copper or silver or yttrium in the specified quantities remain unchanged on the membrane surface. These palladium alloys have, as is known, high hydrogen diffusion coefficients and favorable hydrogen solubilities. For nuclear installations, copper is to be preferred to silver as the alloy partner for the palladium.

In a practical experiment, it was determined that a layer of about 1.5 µm thickness, applied on the gas input side on tantalum and also on niobium (which in each case were saturated with copper at the operation temperature), consisting of about 55 atomic percent copper and 45 atomic percent palladium, did not change its composition as a result of being calcined for ten days at about 590° C. In order to obtain no intermetallic diffusion effects between the palladium-containing surface layer and the tantalum or niobium used as the main material of the membrane, even under very long operation periods, such membranes may be used at temperatures between about 180° C. and about 450° C.

In a long-term experiment, a 1 mm tantalum sheet saturated with copper at 400° C., coated with a layer of approximately 1 µm of Pd/Cu alloy (40 atomic percent: 60 atomic percent) was kept in vacuum at 400° C. for 4,000 hours. Metallographic investigation conducted thereafter showed a structure of the coated diffusion membrane that was still fully intact.

For the production of this diffusion partition, the 1 mm tantalum sheet was subjected to vapor deposition of 0.5 µm of copper and then of 0.5 µm of palladium. The saturation of the membrane itself took place automatically in the first hours of the long-term experiment. It may be effective, however, at the beginning of such treatment to heat the object up to somewhat higher temperatures (up to about 600° C.), in order to obtain the saturation of the base material at operating temperature, along with simultaneous diffusion of the coatings into each other. It makes sense also to activate the surface exposed to gas entry, especially with the assistance of metals, in a known way, so that the hydrogen or tritium absorption is not hindered by adsorption of gases of the primary gas mixture. An exposition of the common activation methods is to be found in "Brennstoffelemente", by W. Vielstich (Verlag Chemie, 1965), pp. 68ff.

It has further been found that alloys exist which, compared for example to pure tantalum, have more suitable hydrogen permeation properties and along therewith also tritium permeation properties for very small $H_2/HT$ partial pressures of the gas phase—such as are present in high temperature reactors (HTRs)—when a membrane of such an alloy is provided with a Cu/Pd layer on the gas entry side. These alloys further have the advantage that supplementary activation can be dispensed with because of the high temperatures.

At temperatures higher than about 400° C. alloys are, accordingly, preferred in practice for the membrane, which contain high tantalum and/or niobium content along with some vanadium and titanium which are then supplementarily alloyed to the greatest extent possible with copper or, in some cases, silver.

These alloys are somewhat similar to the alloys designated as corrosion resistant or acid resistant in U.S. Pat. No. 3,128,178, which contain at least 30% by weight and preferably about 68 to 70% by weight of tantalum. These corrosion resistant alloys also contain 10 to 30% by weight of titanium, 3 to 10% by weight of vanadium and 0.5 to 3% by weight of nickel. It has now been found, that instead of adding nickel, it is possible to saturate these alloys with copper without embrittling them.

This type of alloy is then particularly well-suited as a membrane material for separating H$_2$/HT (at very low partial pressures) out of the primary gas circulation mixture of a high-temperature reactor at temperatures from about 450° to 600° C. For example, an alloy with the atom parts Ti$_{0.5}$Ta$_{0.3}$Cu$_{0.1}$V$_{0.1}$ was melted in an argon atmosphere at about 2000° C., in the course of which a slight portion of the added copper was not picked up but evaporated. This alloy has a high capability for dissolving hydrogen without forming a hydride phase at 300° C. and thereabove in the pressure region up to 1 bar. Solubility measurements, for example, gave the following values for the 400° C. isotherms, where n is the number of hydrogen atoms dissolved per metal atom, and p is the hydrogen partial pressure in [b]-measured in equilibrium:

| $p$ | $10^{-6}$ | $10^{-5}$ | $10^{-4}$ | $10^{-3}$ |
|---|---|---|---|---|
| $n$ | $10^{-2}$ | $3 \cdot 10^{-2}$ | $10^{-1}$ | $3 \cdot 10^{-1}$ |

The following values were found for the 500° C. isotherms:

| $p$ | $10^{-5}$ | $10^{-4}$ | $10^{-3}$ | $10^{-2}$ |
|---|---|---|---|---|
| $n$ | $10^{-2}$ | $3 \cdot 10^{-2}$ | $9 \cdot 10^{-2}$ | $2.5 \cdot 10^{-1}$ |

This alloy has a capability for dissolving hydrogen that is greater by more than one order of magnitude than, for example, the pure metals tantalum, niobium or vanadium. The hydrogen diffusion coefficient is somewhat smaller. It can still be improved by variation of the individual metal component proportions with reference to the permeation rates. In a heat-soaking experiment at 600° C. it has up to now been impossible to find any intermetallic difffusion between the Cu/Pd covering layer on the gas input side and this membrane material.

The tantalum contained in the alloys mentioned, and also smaller portions of the titanium, can be replaced by niobium in quantities up to 25% by weight. It also appears to be possible, even though less favorable for nuclear technology purposes, to replace the copper content partly with silver.

In order to suppress a diminution of the effectiveness of the diffusion membrane on account of oxidation phenomena, a three-layer structure with an internal hydride-containing melt (serving as intermediate layer) is preferably used for the membrane itself, the intermediate melt layer being preferably continuously renewed. With such a three-layer membrane there is located, between two diffusion membranes of the kind already described in detail, a melt located in a thin gap between the two solid membrane elements the melt containing an alkaline or an alkaline earth metal hydride. By way of example (and preferably) lithium hydride with one of the lithium halogenides, is utilized as a eutectic melt. A mixture of 24 mol % LiH with lithium iodide melts at 391° C., another mixture of 30 mol % LiH with lithium bromide melts at 454° C. and the corresponding chloride-containing mixture containing 34 mol % LiH melts at 496° C. These melts, as is known, possess a high ion conductivity for H$^{(-)}$ and at the same time provide that the membranes which are in this case as thin as possible—of a thickness of about 80 to 200 $\mu$m, preferably of about 100 $\mu$m thickness—remain free of oxygen internally, even in the case of long periods of operation. This type of embodiment is particularly favorable when the gas mixture on the primary side of the partition contains hydrogen at partial pressures of several bars. The pressure difference in the gas mixture relative to the pure hydrogen on the secondary side sets forth the driving force for hydrogen permeation through both membranes and through the melt. The thickness of the hydride-containing melt intermediate layer lies between about 10 and a few hundred $\mu$m, preferably between 50 and 100 $\mu$m.

BRIEF DESCRIPTION OF THE DRAWING

Membrane structures according to the invention are illustrated by way of diagrammatic example in the annexed drawing, in which.

Figure 1:
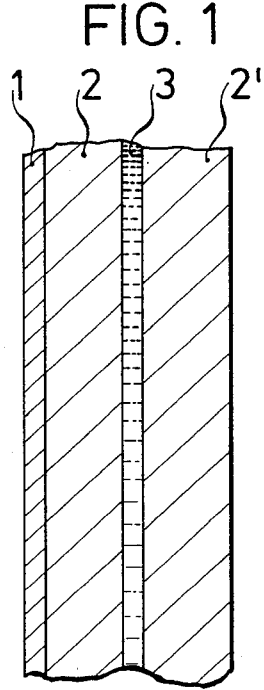
FIG. 1 shows schematically the constitution of a hydrogen diffusion membrane having a palladium alloy layer 1, a membrane material 2,2' and an intermediate melt layer 3, and FIG. 2 schematically shows in cross-section a diffusion partition 2 having a melt 4 on the secondary side boundary, as well as a palladium alloy layer 1 on the gas entry side.

The structure diagrammatically shown in cross-section in FIG. 1 has a layer 1 of an alloy of palladium with copper, silver or yttrium on a membrane material 2,2' which is saturated at operation temperatures with the particular alloy metal used with the palladium (copper, silver or yttrium) and also an intermediate melt layer 3.

In the practical application of the membranes, according to the invention, of metallic material saturated with copper, silver or yttrium, provided with a coating layer of palladium-copper, palladium-silver or palladium-yttrium, respectively, for separation of hydrogen by diffusion, now run into difficulties particularly in operation at raised temperatures and in the separation of only very small quantities of hydrogen—in the form of light hydrogen or its isotopes—as they are present, for example in the primary cooling gas of a nuclear reactor, because over longer periods, even slight impurities of the primary or secondary gas spaces, as for example with water vapor or oxidizing compounds, lead to interference, such as some oxide layer formation (on the secondary side) with corresponding imposition of limitation on the diffusion or even a negative effect on the diffusion phenomenon.

Accordingly, a membrane coated in accordance with the invention with PdAg, PdCu or PdY is put into contact on the secondary side with a melt containing an alkali metal and/or an alkaline earth metal of an affinity or affinities for hydrogen that is higher than that of the coated membrane and also of the hydrogen bonding partner material (e.g. H itself) on the primary side. An alkali metal and/or alkaline earth metal hydride is produced in the form of a suspension or as a solute in the melt.

On account of its higher hydrogen affinity, the melt-containing alkali metal and/or alkaline earth metal provides a hydrogen sink on the secondary side, which has a corresponding positive effect on the hydrogen pass-through velocity through the partition, as well as for preventing an embrittlement of the partition material by hydride formation, as somewhat by zirconium hydride, that can be prevented by the presence of calcium, or also by extensive tantalum hydride formation, which can be limited and mitigated by alkali metal. At the same time the melt prevents the formation of interfering layers on the exit side of the partition, such as oxide layers, for example.

The melt material should be so selected as to assure that its affinity for hydrogen is greater than that of the chemical bonding partner of the hydrogen on the primary side of the partition (i.e., usually hydrogen itself, which is usually present in the primary gas predominantly as $H_2$ or HT).

The separation of hydrogen from gas mixtures according to the invention is preferably performed in an apparatus in which the diffusion walls or partitions are arranged after the fashion of exchange partitions of a heat exchanger, preferably after the manner of a plate-type heat exchanger, in which the gas mixture to be freed of hydrogen and the melt for picking up the diffused hydrogen are moved along the primary and secondary sides, respectively, of the diffusion partition in counter-current to each other. The melt, for example, flows in a thin layer through a narrow gap on the secondary side and, after loading up with hydrogen, is fed over or through a regeneration device and can then be recycled in continuous circulation.

Figure 2:
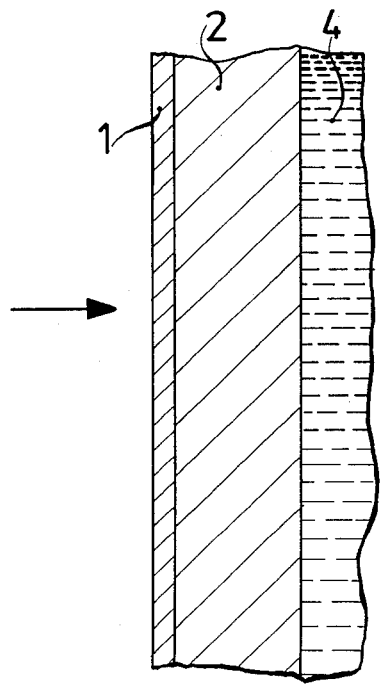

FIG. 2 schematically shows a portion of a diffusion partition 2 with a melt 4 at the secondary side boundary surface and the palladium alloy layer 1 on the gas access side.

For further illustration of the invention, a few examples are now given.

EXAMPLE 1

For a membrane or diffusion partition for use in the $H_2$ partial pressure range from about 1 millibar up to about 30 bars at temperatures from about 180° C. to about 450° C., preferably from 220° C. to 350° C., there is selected, for reasons of hydrogen affinity, tantalum or niobium coated with Pd/Cu (or possibly Pd/Ag) and for the melt at the secondary side, the sodium-potassium alloy (NaK) that is liquid at room temperature. The NaK alloy must contain no nitrogen or carbon impurities. Potassium hydride and sodium hydride are obtained as product in the form of a suspension.

Oxygen content which could lead to corrosion of the membrane material can be gettered by additions of magnesium in the NaK, magnesium being soluble therein up to the order of magnitude of about 1 mol %. Pickup of oxgyen can also be obtained by use of lithium or a melt containing lithium hydride, concerning which it is known that in this way even the oxygen dissolved in metallic zirconium can be extracted. Under the conditions just mentioned, hydrogen flow densities of several $10^{-6}$ moles $H_2/cm^2$ are obtainable.

EXAMPLE 2

For the hydrogen partial pressure range of a gas mixture from about $10^{-6}$ bar up to about $10^{-3}$ bar at temperatures from about 300° C. to 450° C., preferably about 350° C., lithium through its melt form is suitable as an acceptor of hydrogen and its isotopes. The membrane composition is selected in the same manner as in Example 1. For separation of hydrogen (H or T) from the primary gas circulation loop of an HTR, the isotope $^7Li$ should be provided, as thoroughly pure as possible. The expense of such an operation leads to the consideration of the next example which is more favorable from the point of view of cost.

EXAMPLE 3

As membrane material, the above-described alloy type of copper with Ta/Ti/V, and optionally niobium, is provided and on the gas access is coated for a thickness of 0.5 to about 20 μm (preferably about 1 to 5 μm) of copper-palladium (55:45 by weight) alloy. In the same pressure range as in the case of Example 2, but at temperatures from about 450° C. to 600° C., preferably at about 500° C. to 550° C., a melt is provided on the secondary side that has a still higher affinity for hydrogen and its isotopes than lithium has. Advantageously, a melt of alkaline earth metals in which calcium is soluble is utilized. For example, a mixture of barium and magnesium with 66 atomic percent barium that is known to melt at 358° C., is used, which is capable of dissolving up to about 35 At% calcium. A calcium-magnesium melt, liquid at 445° C. (when containing 27 atomic percent Mg), can also be used. The low melting ternary system Ba/Mg/Ca is more favorable, however, in view of its affinity for hydrogen and its isotopes.

It is of course also possible (particularly for conventional applications) to operate the membranes of Example 3 with lithium as hydrogen acceptor at hydrogen partial pressures up to about 100 millibars and up to about 600° C. Other combinations of membranes and acceptor melts of the above-described variants with each other are also possible, so that for each application case a suitable selection can be provided.

The diffusion membrane coated with palladium alloy according to the invention can, importantly, also be provided in double-membrane form with an outward facing primary side on each of the twin membranes and an inner secondary side where melt is provided for both of the twin membranes in a gap between them.

It should be understood with respect to each of the variants of Examples 1,2 and 3 that hydrogen and/or its isotopes can be separated from the melt. It is known that the suspended hydrides obtained can be separated out of the alkali metal or alkaline earth metal melts by filtering.

It is furthermore possible to heat the suspensions strongly and thereby to obtain gaseous hydrogen and its isotopes by thermal decomposition.

A further known method of recovering the hydrogen is to lead the suspension into a fluid melt halogenide bath—e.g. after the fashion of a column—so that the hydride is extracted and that the alkali metal or alkaline earth metal impoverished in its concentration of the hydride is led back to the rest of the apparatus. These halogenide/hydride melts, as is known, can be treated with electrolysis, so that the alkali metal or alkaline earth metal is recovered at the cathode while hydrogen and its isotopes are obtained in gas form at the anode.

Although the invention has been described with reference to particular specific examples, it will be recognized that modifications and variations beyond those actually described are possible within the inventive concept. It may be useful for example to provide a coating of Pd/Cu, Pd/Ag or Pd/y on the hydrogen exit side of the partition, as well as on the hydrogen entry side.

We claim:

1. Hydrogen diffusion membrane consisting essentially of a metallic material selected from the group consisting of tantalum, niobium, titanium, vanadium, nickel and alloys and mixtures of two or more of the foregoing, which material is non-porous but selectively permeable for hydrogen, having a palladium alloy coating on the hydrogen entry side and having the improvement wherein:

said palladium alloy coating is of an alloy of palladium and an alloy partner metal selected from the group consisting of copper, silver and yttrium with a content of at least 45 atomic % copper or at least 50 atomic % silver or at least 7 atomic % yttrium, and said material of said membrane itself has a content of the same alloy partner metal as in said palladium alloy which is in a concentration at least sufficient for equilibrium with the palladium alloy.

2. A membrane according to claim 1 in which said metallic material of said membrane is saturated with said metal selected from the group consisting of copper, silver and yttrium.

3. Membrane according to claim 2 in which said metallic material of said membrane consists predominantly of a substance selected from the group consisting of tantalum, niobium and alloys and mixtures of tantalum and niobium.

4. Membrane according to claim 1 in which said metallic material of said membrane consists predominantly of a substance selected from the group consisting of tantalum, niobium and alloys and mixtures of tantalum and niobium.

5. Membrane according to claim 4 in which said palladium alloy is an alloy of palladium and an alloy partner metal selected from the group consisting of copper and silver and in which said metallic material of said membrane consists of an alloy composed of not less than 10% nor more than 30% by weight of titanium, not less than 3% and not more than 10% by weight of vanadium, not more than 25% by weight of niobium and at least 30% by weight of tantalum, said alloy constituting said membrane being saturated with said alloy partner metal selected from the group consisting of copper and silver.

6. Membrane according to claim 5 in which said palladium alloy is an alloy of palladium and copper and in which said metallic material of said membrane consists of an alloy of at least 20% and not more than 25% by weight of titanium, at least 5% and not more than 7.5% by weight of vanadium, not more than 25% by weight of niobium and at least 50% by weight of tantalum, which alloy constituting said membrane is saturated with copper.

7. Membrane according to claim 1 in which an intermediate layer in the form of a melt, forming or containing a metal hydride substance, is interposed between outer layers of said metallic material of said membrane, thereby providing a three-layer structure, on the hydrogen entry side of which said palladium alloy coating is provided, said metal hydride being selected from the group of alkali metal hydrides, alkaline earth metal hydrides and mixtures of alkali metal and alkaline earth metal hydrides.

8. Membrane according to claim 7 in which said interposed layer in said membrane is formed by a melt containing a eutectic mixture of lithium hydride with a halogenide of lithium.

9. Membrane according to claim 7 in which said membrane is coated on the hydrogen exit side with an additional coating of an alloy of palladium with said metal selected from the group consisting of copper, silver and yttrium having a content of at least 45 atomic % copper or at least 50 atomic % silver or at least 7 atomic % yttrium.

10. Membrane according to claim 7 in which said membrane is coated on the hydrogen exit side with an additional coating of an alloy of palladium with said metal selected from the group consisting of copper, silver and yttrium having a content of at least 45 atomic % copper or at least 50 atomic % silver or at least 7 atomic % yttrium.

11. Membrane according to claim 1 in which said membrane is coated on the hydrogen exit side with an additional coating of an alloy of palladium with said metal selected from the group consisting of copper, silver and yttrium having a content of at least 45 atomic % copper or at least 50 atomic % silver or at least 7 atomic % yttrium.

12. Membrane according to claim 1, in which said palladium alloy coating is of an alloy of palladium and copper.

13. Membrane according to claim 1, in which said palladium alloy coating is of an alloy of palladium and silver.

14. Method for the separation of hydrogen from gas mixtures by diffusion at elevated temperature through a membrane of a metallic material having a coating of a palladium alloy on the hydrogen entry side, said method comprising the steps of:

utilizing a membrane in which said palladium alloy coating is an alloy of palladium and an alloy partner metal selected from the group consisting of copper, silver and yttrium with a content of at least 45 atomic % copper, or at least 50 atomic % silver, or at least 7 atomic % yttrium, while the metallic material of the membrane itself has a content of the same alloy partner metal as in said palladium alloy which is in a concentration at least sufficient for equilibrium with the palladium alloy;

causing the hydrogen, after passing through a layer of the metallic material of said membrane, to come into contact with a melt containing a substance selected from the group consisting of alkali metals, alkaline earth metals and mixtures of alkali and alkaline earth metals having an affinity for hydrogen which is higher than that of the metallic material of said membrane and of that of the hydrogen bonding in said gas mixture and which is capable of forming a hydride either in solution in said melt or as a suspension therein.

15. Method according to claim 14 in which said melt is an alkali metal melt in which the alkali metal is selected from the group consisting of sodium-potassium mixtures and molten lithium.

16. Method according to claim 14 in which said melt is a melt containing alkaline earth metal in the form of a eutectic mixture of barium and magnesium in which calcium is dissolved to an extent not exceeding 40 atomic %.

17. Method according to claim 14 in which a subsequent step is produced of filtering out the metal hydride formed in the melt and then decomposing it to recover hydrogen and regenerate the metal.

18. Method according to claim 14 in which a further step is performed of heating said melt in order to decompose hydrides formed therein, for recovery of the hydrogen and regeneration of the metal.

19. Method according to claim 14 in which the further step is performed of separating the hydrogen compound produced in said melt by dissolving it in a halogenide melt.

20. Method according to claim 19 in which the solution of said hydride in halogenide melt is subjected to fluid melt electrolysis for recovery of hydrogen.

* * * * *